United States Patent
Brissette

(10) Patent No.: US 6,860,815 B2
(45) Date of Patent: Mar. 1, 2005

(54) METHOD AND APPARATUS FOR DETECTING WORN UNIVERSAL JOINT COMPONENTS

(75) Inventor: Ronald N. Brissette, Lake Orion, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 0 days.

(21) Appl. No.: 10/443,213

(22) Filed: May 22, 2003

(65) Prior Publication Data

US 2004/0235572 A1 Nov. 25, 2004

(51) Int. Cl.[7] .............................................. F16D 3/41
(52) U.S. Cl. ........................................ 464/14; 464/23
(58) Field of Search .............................. 464/11–14, 23, 464/136; 137/541

(56) References Cited

U.S. PATENT DOCUMENTS

| | | | | |
|---|---|---|---|---|
| 999,829 A | * | 8/1911 | McNutt | 137/541 X |
| 1,993,357 A | * | 3/1935 | Braun et al. | 464/14 X |
| 2,025,502 A | * | 12/1935 | Fageol | 464/14 |
| 2,784,737 A | * | 3/1957 | Allcott | 137/541 X |
| 4,419,086 A | * | 12/1983 | Condon | 464/14 |
| 5,718,633 A | * | 2/1998 | Gehrke | 464/23 |
| 5,971,016 A | * | 10/1999 | Wass et al. | 137/541 |

* cited by examiner

Primary Examiner—Greg Binda
(74) Attorney, Agent, or Firm—Carlson, Gaskey & Olds.

(57) ABSTRACT

A method and apparatus for detecting the operating condition of a universal joint in a driveline assembly utilizes a pressure relief valve that is supported by a universal joint cross member. The cross member includes a central body portion with a plurality of radially extending trunnions. A first driveline component supports a first yoke member and a second driveline component supports a second yoke member. Each yoke member cooperates with two opposing trunnions to interconnect the first and second driveline components. An internal lubrication channel is formed within the cross member and is in fluid communication with each trunnion. Seal assemblies are installed within cups mounted to each trunnion member to seal the lubricating fluid within the cross member. The universal joint is operating properly when lubricating fluid that is injected through an external lubrication fitting during service operations, exits via the pressure relief valve. The universal joint is not operating properly when the lubricating fluid exits via at least one of the seal assemblies instead of through the pressure relief valve.

22 Claims, 4 Drawing Sheets

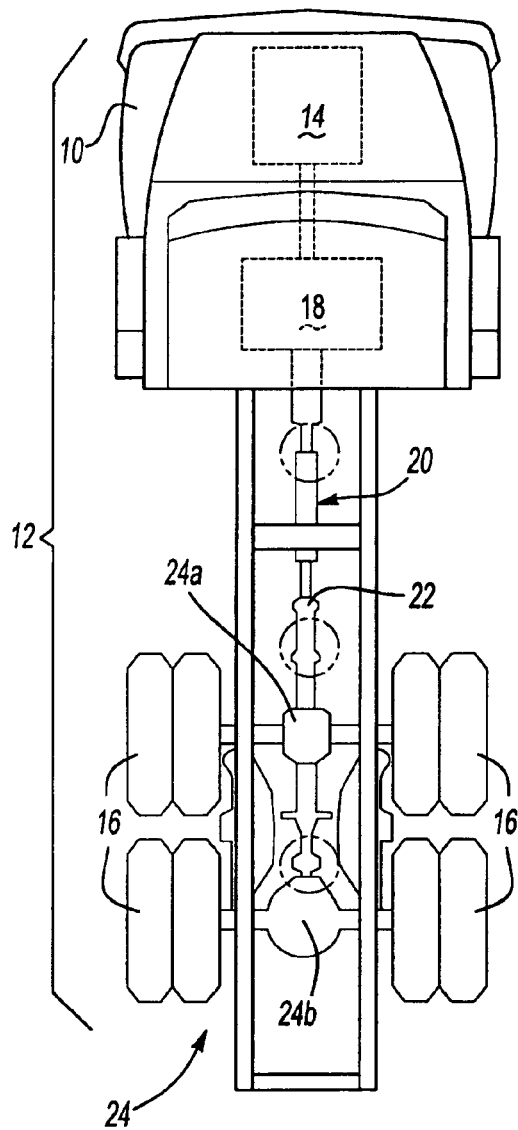
_Fig-1_
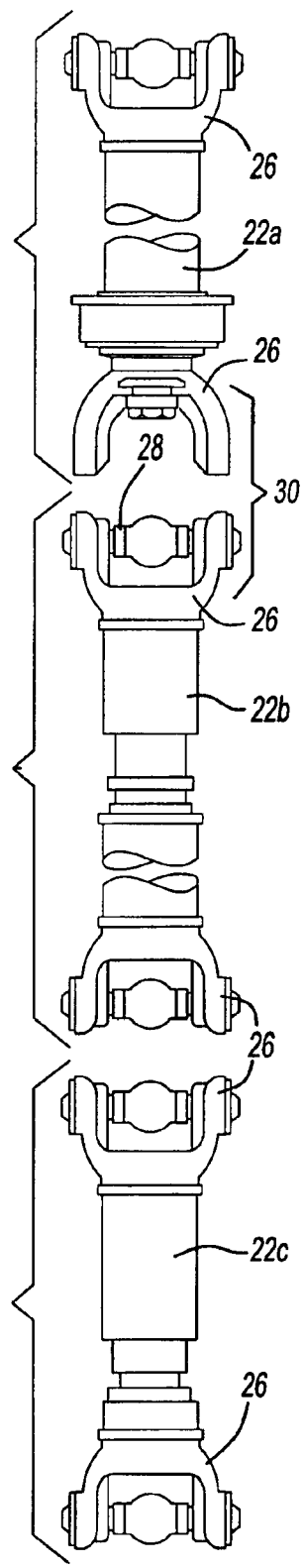
_Fig-2_

METHOD AND APPARATUS FOR DETECTING WORN UNIVERSAL JOINT COMPONENTS

BACKGROUND OF THE INVENTION

This invention generally relates to a method and apparatus for servicing a universal joint assembly installed in a vehicle driveline to detect worn components.

Vehicle drivelines include at least one driveshaft that is used to transmit power from a vehicle engine and transmission to a single drive axle or tandem drive axle. Typically, heavy-duty vehicles, such as large trucks, include more than one driveshaft due to the long wheelbase and/or use of a tandem drive axle. At each end of a driveshaft, universal joints (U-joints) are used to connect the driveshaft to the next driveline component. For example, U-joints can be used to connect one driveshaft to another driveshaft or can be used to connect a driveshaft to a drive axle component.

U-joints allow two driveline components to be positioned at different angles relative to each other to accommodate relative movement and angular misalignment. Further, as the drive axles cooperate with a vehicle suspension to dampen shocks from rough road conditions, the U-joints provide flexibility to allow the adjoining driveline components to move relative to one another.

Typically, U-joints include two yokes that each have two bore locations at diametrically opposed positions. The yokes are each mounted to two trunnions on a center cross member. The combination allows the two yokes to move angularly relative to each other with respect to the center of the cross member.

In order for the U-joint to operate properly overlong periods of time, it is important to have good lubrication. The center cross member typically includes an external grease fitting that is in fluid communication with each of the trunnion members via internal grease grooves or channels. Bearing packs are mounted on each of the trunnions and receive lubrication through the grease grooves. The bearing packs include a seal assembly that seals the grease within the center cross member.

It is often difficult to detect when U-joint components have worn sufficiently, such that repair or replacement operations are required. Currently, to detect worn seals, the U-joint must be completely disassembled and inspected. This process is time consuming and labor intensive, which results in increased service costs and vehicle downtime, both of which are undesirable.

Thus, it would be valuable to have a simple and efficient inspection procedure to detect worn U-joint components without having to disassemble the U-joint. The method and apparatus to detect worn components should be easily incorporated into existing U-joints without significant increases in cost.

SUMMARY OF THE INVENTION

A serviceable, permanently lubed, universal joint assembly utilizes a fluid pressure member to detect the operating condition of a universal joint assembly during a service operation. The universal joint assembly includes a cross member having a plurality of trunnions that cooperate with yoke members supported by adjacent driveline components. Each trunnion supports a seal and bearing assembly which are mounted within a cap installed over a distal end portion of the trunnion.

The operating condition of the internal components, such as bearings and seals, can be easily detected without having to disassemble the universal joint assembly. A lubricating fluid is injected into the cross member via an external lubrication fitting. A properly operating universal joint assembly is detected when lubricating fluid exits the fluid pressure member, and an improperly operating universal joint assembly is detected when the lubricating fluid exits at least one of the seal assemblies instead of the fluid pressure member.

In the preferred embodiment, the cross member includes a central body portion with a first pair of trunnions coupled to a first yoke member and a second pair of trunnions coupled to a second yoke member. The cross member includes an internal lubrication channel that is in fluid communication with each of the trunnions. An external lubrication fining is supported by the cross member and is in fluid communication with the internal lubrication channel. The fluid pressure member is supported by the cross member and also is in fluid communication with the internal lubrication channel. An internal fluid pressure is generated within the cross member in response to a lubricating fluid being injected into the internal lubrication channel via the external lubrication fitting. A first operating condition is indicated when the internal fluid pressure is below a predetermined pressure value and a second operating condition, different than the first operating condition, is indicated when the internal fluid pressure exceeds the predetermined pressure value.

As discussed above, each of the trunnions includes a seal assembly that seals the lubricating fluid within the internal lubrication channel. Each seal assembly has a predetermined initial sealing force that is greater than the predetermined pressure value. The first operating condition is defined as the improperly operating universal joint and occurs when at least one of the seal assemblies has an operating sealing force that is less than the predetermined initial sealing force and less than the predetermined pressure value, such that the lubricating fluid exits the cross member through the defective seal assembly instead of through the fluid pressure member. The second operating condition is defined as the properly operating universal joint and occurs when the internal fluid pressure achieves the predetermined pressure value, which activates the fluid pressure member and allows lubricating fluid to exit the cross member via the fluid pressure member.

In one disclosed embodiment, the fluid pressure member comprises a pressure relief valve mounted directly to the cross member. The pressure relief valve is resiliently biased such that lubricating fluid cannot exit the cross member until the predetermined pressure value is achieved. The pressure relief valve is preferably threaded to the central body portion and is centrally positioned on an end face of the central body portion or on an edge between adjacent trunnions.

Thus, the subject invention provides a method and apparatus for easily detecting worn components in a universal joint assembly without requiring the universal joint assembly to be disassembled. These and other features of the present invention can be best understood from the following specifications and drawings, the following of which is a brief description.

BRIEF DESCRIPTION OF THE DRAWINGS

FIG. 1 is an overhead schematic view of driveline for a heavy-duty vehicle.

FIG. 2 is a magnified exploded view of a portion of the driveline from FIG. 1.

DETAILED DESCRIPTION OF A PREFERRED EMBODIMENT

Figure 3:
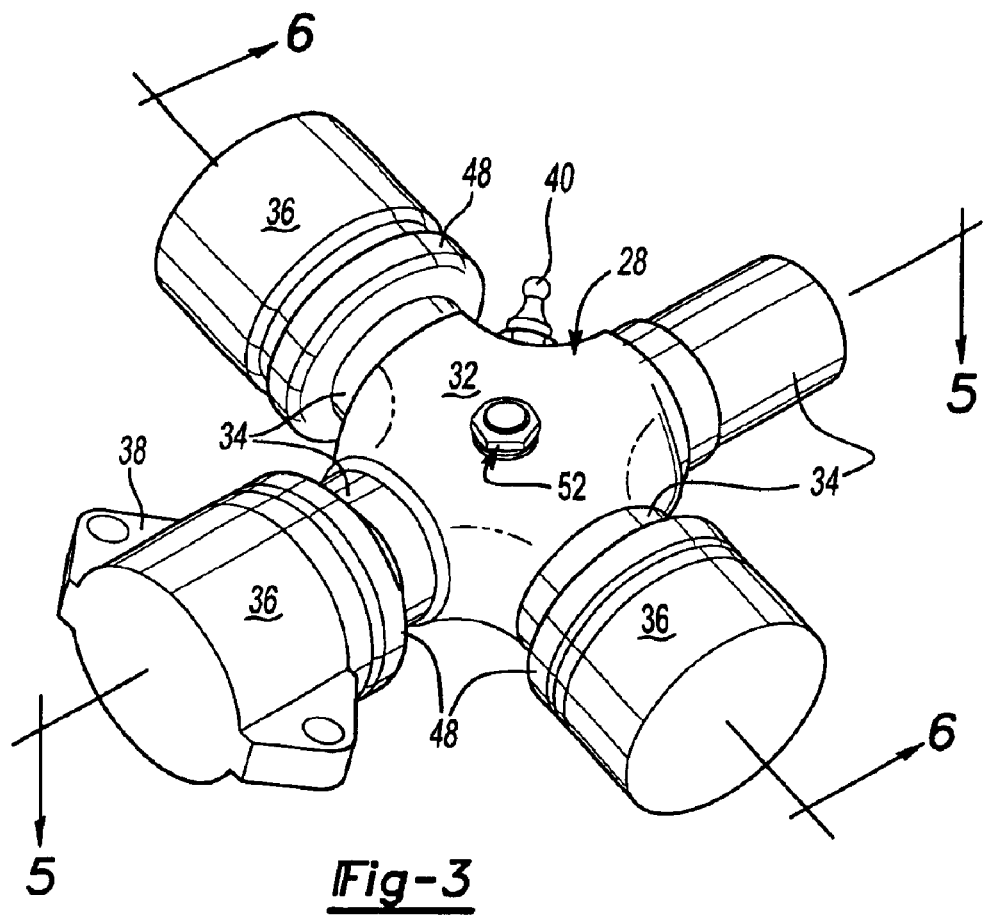
FIG. 3 is a perspective view of a universal joint cross member incorporating the subject invention.
Figure 4:
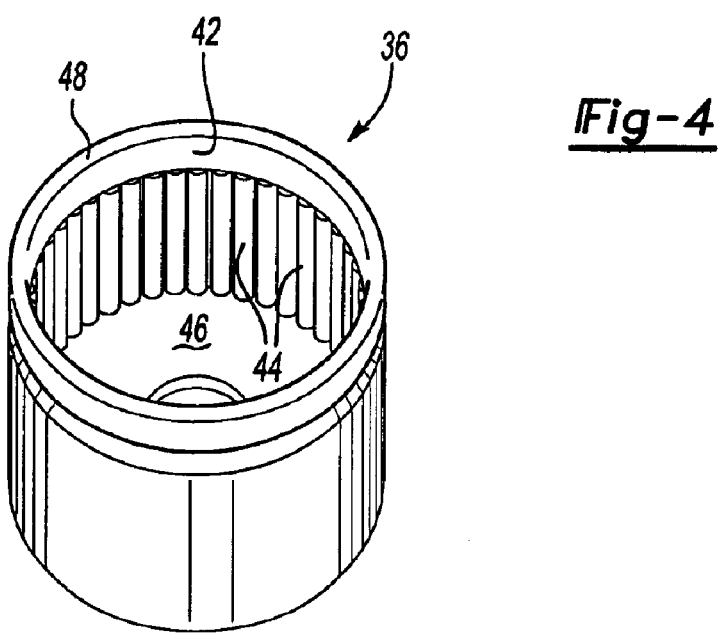
FIG. 4 is a perspective internal view of one of the needle cups of FIG. 3.

A heavy-duty vehicle 10 includes a powertrain assembly, shown generally at 12, that transfers driving power from an engine 14 to a plurality of wheels 16. The engine 14 is operably coupled to a transmission 18 as is known in the art. A driveline assembly 20, including at least one driveshaft 22, is used to transfer driving power from the transmission 18 to a drive axle assembly 24 that supports the wheels 16. The drive axle assembly 24 can be a single drive axle (not shown) or can be a tandem drive axle as shown in FIG. 1. The tandem drive axle includes a forward-rear axle 24a and a rear—rear axle 24b that are interconnected to each other.

Preferably, due to the long wheelbase required for heavy-duty vehicles 10 and/or due to the use of a tandem drive axle, a plurality of driveshafts 22 are used to connect the transmission 18 to the drive axle assembly 24. It should be understood however, that while multiple driveshafts 22 are preferred, a single driveshaft 22 could be used to connect the transmission 18 to a single drive axle for lighter duty applications.

FIG. 2 shows a typical driveshaft arrangement that includes a first driveshaft 22a connected to the transmission 18 at one end and connected to a second driveshaft 22b at an opposite end. The second driveshaft 22b is connected to the drive axle assembly 24 at an end opposite from connection to the first driveshaft 22a. A third driveshaft 22c is used to interconnect the forward-rear axle 24a to the rear—rear axle 24b. A yoke member 26 is supported on each end of the driveshafts 22a, 22b, 22c. A cross member 28 is used to interconnect adjoining yoke members 26. One cross member 28, coupled to two (2) yoke members 26, defines a universal joint assembly (U-joint) 30.

U-joints allow two adjoining driveline components to be positioned at different angles relative to each other to accommodate relative movement and angular misalignment. Misalignment and relative movement can be caused by adjoining driveline components not being mounted within a common plane, or can be caused by a driveline component, such as a drive axle assembly 24, moving relative to adjoining driveline component, such as a driveshaft 22, in response to interaction with a vehicle suspension.

The cross member 28 is shown in greater detail in FIG. 3. The cross member 28 includes a central body portion 32 with a plurality of trunnions 34 extending out radially from the central body portion 32. Each yoke member 26 is attached to a pair of trunnions 34, as is known in the art.

Bearing packs or needle cups 36 are installed over each trunnion 34. The needle cups 36 include a mounting interface 38 that attaches to the yoke member 26. The cross member 28 shown in FIG. 3 has one exposed trunnion 34 and three trunnions with installed needle cups 36. The central body portion 32 also includes at least one external lubrication fitting 40 through which a lubricating fluid, such as grease, is injected into the cross member 28 to provide lubrication so that the U-joint 30 can operate properly.

Each needle cup 36 includes an internal cavity 42 that is slidably received over one trunnion 34. A plurality of needle bearings 44 is mounted within the cavity 42. A thrust washer 46 is preferably mounted within the bottom of the cavity 42 and a seal assembly 48 surrounds a lip of the cavity 42 to seal the lubricating fluid within the cross member 28.

Figure 5:
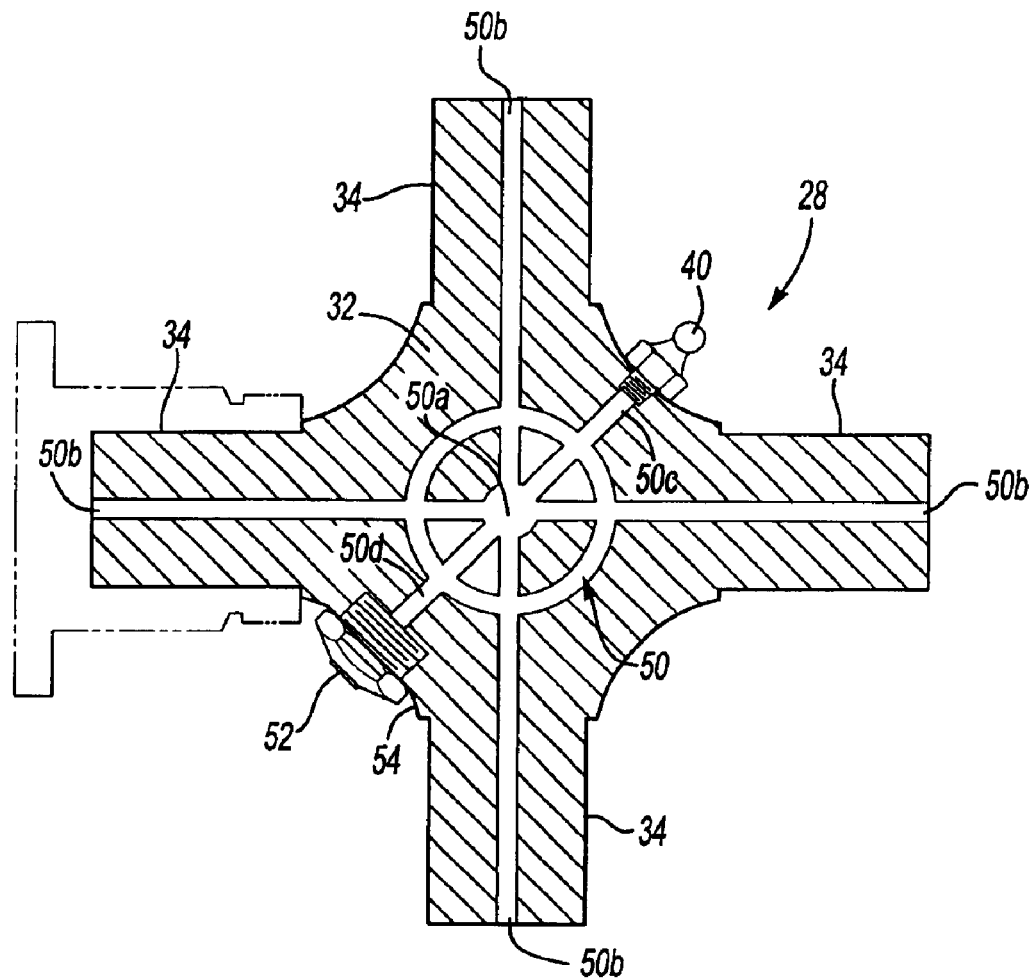
FIG. 5 is top cross-sectional view of the cross member of FIG. 3.

The cross member 28 includes an internal lubrication channel 50, shown in FIG. 5, which is in fluid communication with the external lubrication fitting 40. The internal lubrication channel 50 includes a central portion 50a, trunnion portions 50b that extend into each trunnion 34, and a fitting portion 50c that communicates with the lubrication fitting 40. This allows lubricating fluid, which is injected through the lubrication fitting 40, to be communicated through internal lubrication channel 50 to each trunnion 34, so that the needle bearings 44 can be sufficiently lubricated.

A fluid pressure member 52 is supported by the central body portion 32 and is positioned to be in fluid communication with the internal lubrication channel 50. The fluid pressure member 52 is utilized during service operations to detect U-joints 30 that have worn internal components, such as bearings 44 and seal assemblies 48, without having to disassemble the U-joint 30.

Each of the seal assemblies 48 has a predetermined initial sealing force when the U-joint 30 is first assembled. Over time, as components wear and as the vehicle 10 experiences heavy operating loads and adverse road conditions, the initial sealing force is reduced. During service, lubricating fluid is injected with a grease gun or other similar mechanism, into the cross member 28 via the lubrication fitting 40. This generates an internal fluid pressure within the cross member 28. If the seal assemblies are still in good working condition, the internal lubrication channel 50 will fill with fluid until fluid is forced to exit via the fluid pressure member 52. Thus, the fluid pressure member 52 is responsive to or activated when a predetermined pressure value is achieved within the cross member 28. This predetermined pressure value is less than the initial sealing force for the seal assemblies 48.

If the seal assemblies 48 are worn and need to be replaced, as the internal fluid pressure increases, fluid will exit the cross member 28 via the defective seal assembly 48, instead of through the fluid pressure member 52. In other words, fluid will exit the cross member 28 from a defective seal assembly 48 because the worn seal has a reduced sealing force is less than the predetermined pressure value that activates the fluid pressure member 52. Thus, when fluid exits the cross member from the fluid pressure member 52, the U-joint 30 internal components are still in good operating condition, and when the fluid exits from at least one of the seal assemblies 48, a worn internal component is detected. Thus, a simple external visual inspection can be used to detect internal worn components.

In one embodiment, the fluid pressure member 52 is located at an edge 54 of the central body portion 32 of the cross member 28, as shown in FIG. 5. The fluid pressure member 52 in this embodiment, is positioned between adjacent trunnions 34 and extends out radially from the central body portion 32. The internal lubrication channel 50 is formed with a channel portion 50d that extends to the fluid pressure member 52.

Figure 6:
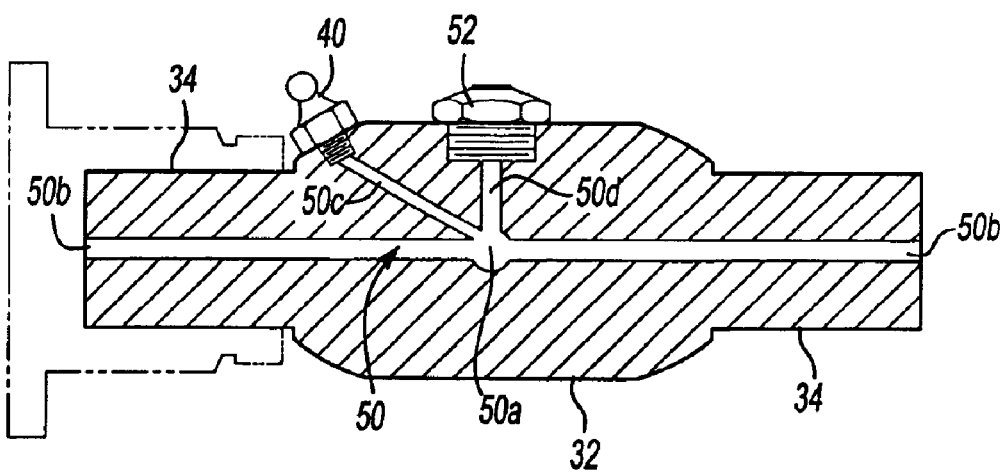
FIG. 6 is a side cross-sectional view of another embodiment of a cross member incorporating the subject invention.

In another embodiment, the fluid pressure member 52 is located centrally on the central body portion 32, as shown in FIGS. 3 and 6. The internal lubrication channel 50 includes a similar channel portion 50d that communicates with the fluid pressure member. It should be understood that the fluid pressure member 52 could be mounted in other positions or locations on the central body portion 32. Similarly, the external lubrication fitting 40 could also be mounted at other locations on the central body portion.

Figure 7:
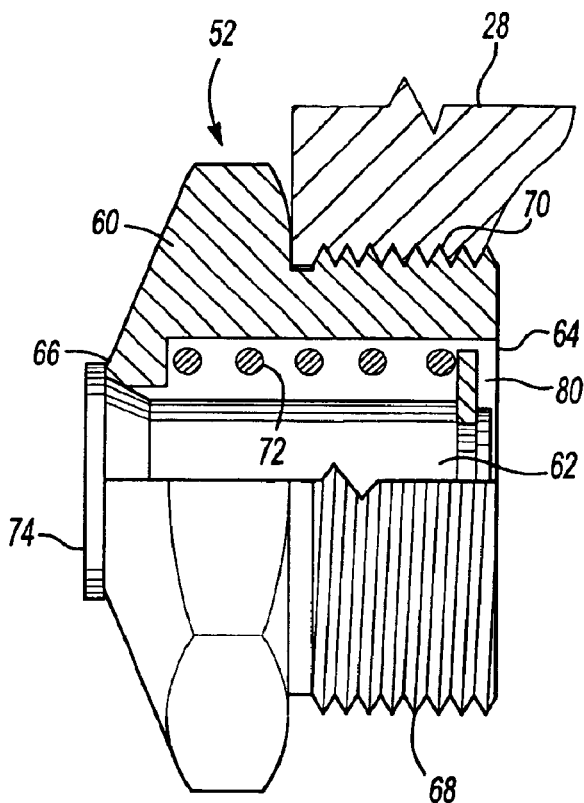
FIG. 7 is side view shown in partial cross-section of a fluid pressure member in a first position.
Figure 8:
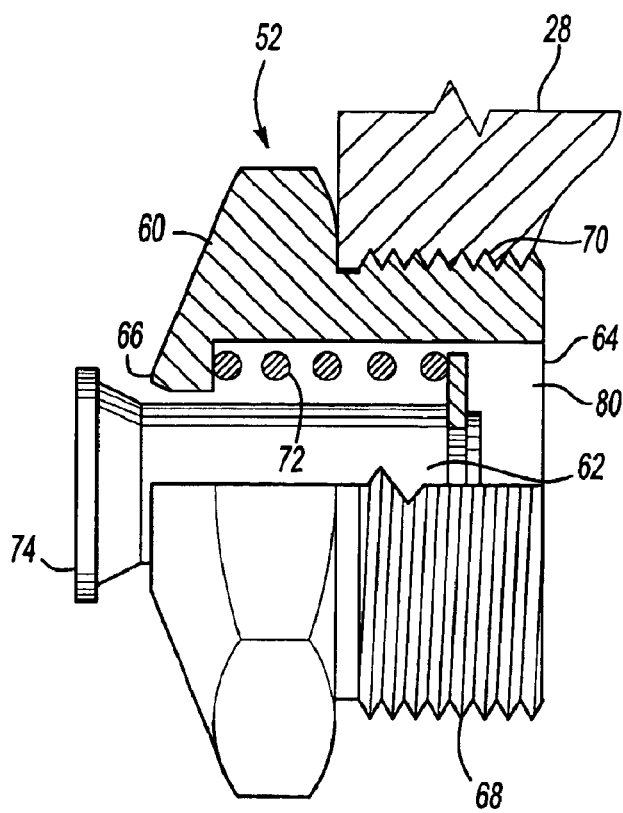
FIG. 8 is side view shown in partial cross-section of a fluid pressure member in a second position.

Preferably, the fluid pressure member 52 is a pressure relief valve 60 that is movable between a sealed or closed position, shown in FIG. 7, and an unsealed or open position, shown in FIG. 8. The pressure relief valve 60 includes a longitudinal valve body 62 mounted within a bore 80 that extends from an internal end 64 to an external end 66. The internal end 64 of the bore 80 is in fluid communication with the internal lubrication channel 50 and the external end of the bore 80 is selectively opened to the external atmosphere when the predetermined pressure value is achieved within the cross member 28.

The pressure relief valve 60 preferably includes a threaded external surface 68 that is threaded into a threaded bore 70 formed within the cross member 28. A resilient member 72, such as a coil spring or other similar mechanism, cooperates with a movable cap 74 formed on the valve body 62. The movable cap 74 is resiliently biased to seal the external end 66 of the bore 80 under normal operating conditions. During a service operation, when lubricating fluid is injected into the cross member 28 and the internal fluid pressure is greater than the predetermined pressure value, the resilient bias force is overcome and the movable cap 74 opens. This allows fluid communication to the external surface of the cross member 28 via the external end 66 of the bore 80. Once the internal pressure is reduced, the resilient member 72 returns the movable cap to the initial position.

The subject invention provides a method and apparatus for easily detecting worn components in a universal joint assembly that does not require disassembly. An additional benefit is that a simple external visual inspection can be used to detect internal worn components in the U-joint. Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A universal joint assembly comprising:
   a first yoke member;
   a second yoke member,
   a cross member including a central body portion with a first pair of trunnions coupled to said first yoke member and a second pair of trunnions coupled to said second yoke member wherein said cross member includes an internal lubrication channel in fluid communication with each of said first and second pairs of trunnions;
   an external lubrication fitting supported by said cross member and in fluid communication with said internal lubrication channel; and
   a fluid pressure member supported by said cross member and in fluid communication with said internal lubrication channel wherein an internal fluid pressure is generated within said cross member in response to a lubricating fluid being supplied to said internal lubrication channel via said external lubrication fitting and wherein said fluid pressure member indicates a first operating condition when said internal fluid pressure is below a predetermined pressure value and indicates a second operating condition different than said first operating condition when said internal fluid pressure exceeds said predetermined pressure value, said fluid pressure member including a first component movable relative to an external surface of said cross member and a second component resiliently biasing said first component and wherein said first component moves between a first position in said first operating condition where said first component engages said external surface of said cross member and a second position in said second operating condition wherein at least a portion of said first component is moved out of engagement with said external surface.

2. The universal joint assembly as set forth in claim 1 wherein each of said first and second pairs of trunnions is partially covered by a cup having a seal assembly that seals said lubricating fluid within said internal lubrication channel, with each seal assembly having a predetermined initial sealing force that is greater than said predetermined pressure value.

3. The universal joint assembly as set forth in claim 2 wherein said second operating condition is defined as a properly operating universal joint and wherein said fluid pressure member is activated when said internal fluid pressure achieves said predetermined pressure value to indicate said second operating condition.

4. The universal joint assembly as set forth in claim 3 wherein said first operating condition is defined as an improperly operating universal joint and wherein at least one of said seal assemblies has an operating scaling force that is less than said predetermined initial scaling force such that said fluid pressure member is inactive indicating said first operating condition.

5. The universal joint assembly as set forth in claim 4 wherein lubricating fluid exits said cross member via said fluid pressure member in response to injection of said lubricating fluid through said external lubrication fitting under said second operating condition and wherein lubricating fluid exits said cross member via at least one of said seal assemblies when said operating sealing force is less than said predetermined initial sealing force in response to injection of said lubricating fluid through said external lubrication fitting under said first operating condition.

6. The universal joint assembly as set forth in claim 5 wherein said fluid pressure member comprises a pressure relief valve mounted directly to said cross member.

7. The universal joint assembly as set forth in claim 6 wherein said pressure relief valve includes a longitudinal bore having an internal end in fluid communication with said internal lubrication channel and an external end in fluid communication with said external surface of said cross member and wherein said first component comprises a movable cap member and said second component comprises a resilient member, said resilient member cooperating with, said movable cap member such that when said internal fluid pressure is less than said predetermined pressure value said movable cap is resiliently biased to seal said external end and when said internal fluid pressure is greater than said predetermined pressure value said movable cap allows fluid communication to said external surface via said external end.

8. The universal joint assembly as set forth in claim 7 wherein said pressure relief valve includes an externally threaded body portion threadably engaged to a threaded bore formed in said cross member.

9. The universal joint assembly as set forth in claim 8 wherein said threaded bore is centrally positioned on said central body portion.

10. The universal joint assembly as set forth in claim 8 wherein said threaded bore is positioned on an edge of said central body portion between adjacent trunnions.

11. The universal joint assembly as set forth in claim 1 wherein said fluid pressure member comprises a visual indicator that identifies whether the universal joint assembly is in said first or second operating condition during a visual inspection.

12. The universal joint assembly as set forth in claim 1 wherein said cross member includes a bore extending transverse of said internal lubricated channel, said bore having a first bore end in direct fluid communication with said internal lubrication channel and a second bore end in direct fluid communication with said external surface of said cross member and wherein said first component is mounted within said bore.

13. The universal joint assembly as set forth in claim 12 wherein said first bore end is in direct fluid communication with a central portion of said internal lubrication channel adjacent a center of said cross member.

14. The universal joint assembly as set forth in claim 12 wherein said first component comprises a valve body with an end cap, said valve body bring received within said bore with said end cap being movable relative to said external surface of said cross member and wherein said second component comprises a resilient member having a resilient bias fore that resiliently biases said end cap into engagement with said external surface of said cross member in said first position with the resilient bias force being overcome when said internal fluid pressure exceeds said predetermined pressure value to move said end cap outwardly away from said external surface of said cross member into said second position.

15. The driveline assembly as set forth in claim 14 wherein said first bore end is in direct fluid communication with a central portion of said internal lubrication channel adjacent a center of said cross member.

16. A driveline assembly comprising:
 a first driveline component;
 a first yoke member supported by said first driveline component;
 a second driveline component positioned adjacent to said first driveline component;
 a second yoke member supported by said second driveline component;
 a cross member having a plurality of bearing members cooperating with said first and second yoke members to interconnect said first and second driveline components, said cross member having an internal lubrication channel that supplies lubricating fluid to said plurality of bearing members; and
 a fluid pressure member supported by said cross member and in fluid communication with said internal lubrication channel wherein an internal fluid pressure is generated within said cross member in response to a lubricating fluid being supplied to said internal lubrication channel via an external lubrication fitting with said fluid pressure member indicating a first operating condition when said internal fluid pressure is below a predetermined pressure value and indicating a second operating condition different than said first operating condition when said internal fluid pressure exceeds said predetermined pressure value, said cross member including a bore extending transverse of said internal lubrication channel, said bore having a first bore end in direct fluid communication with said internal lubrication channel and a second bore end in direct fluid communication with an external surface of said cross member and wherein said fluid pressure member moves between a first position where said second bore end is sealed at said external surface to indicate said first operating condition and a second position where said second bore end is opened to said external to inlet said second operating condition.

17. The driveline assembly as set forth in claim 16 wherein said first and second driveline components are driveshafts.

18. The driveline assembly as set forth in claim 16 wherein said first driveline component comprises a driveshaft and said second driveline component comprises a drive axle assembly.

19. The driveline assembly as set forth in claim 16 wherein said cross member includes a central body portion with four trunnions extending out radially from said central body portion with two of said trunnions being coupled to said first yolk member and two of said trunnions being coupled to said second yoke member with said internal lubrication channel being in fluid communication with each of said four trunnions.

20. The driveline assembly as set forth in claim 19 wherein each of said four trunnions includes a seal assembly that seals said lubricating fluid within said internal lubrication channel with each seal assembly having a predetermined initial sealing force that is greater than said predetermined pressure value and wherein said first operating condition is defined as an improperly operating universal joint with at least one of said seal assemblies having an operational sealing force that is less than said predetermined initial sealing force and said second operating condition is defined as a properly operating universal joint assembly with said fluid pressure member being activated when said internal fluid pressure achieves said predetermined pressure value.

21. The driveline assembly as set forth in claim 16 wherein said fluid pressure member comprises a pressure relief valve mounted directly to said cross member.

22. The driveline assembly as set forth in claim 16 wherein said fluid pressure member includes a valve body with an end cap and a resilient member, said valve body being received within said bore with said end cap being movable relative to said external surface of said cross member, and said resilient member having a resilient bias force that resiliently biases said end cap into engagement with said external surface of said cross member in said first position with the resilient bias force being overcome when said internal fluid pressure exceeds said predetermined pressure value to move said end cap outwardly away from said external surface of said cross member into said second position.

* * * * *

UNITED STATES PATENT AND TRADEMARK OFFICE
CERTIFICATE OF CORRECTION

PATENT NO. : 6,860,815 B2
APPLICATION NO. : 10/443213
DATED : March 1, 2005
INVENTOR(S) : Ronald N. Brissette It is certified that error appears in the above-identified patent and that said Letters Patent is hereby corrected as shown below:

Column 6, line 29
"scaling" should be replaced with --sealing--

Column 7, Line 11
"lubricated" should be replaced with --lubrication--

Column 7, Line 23
"bring" should be replaced with --being--

Column 7, Line 27
"fore" should be replaced with --force--

Column 8, Line 14
Please add --surface-- after "external"

Column 8, Line 14
"inlet" should be replaced with --indicate--

Column 8, Line 26
"yolk" should be replaced with --yoke--

Signed and Sealed this

Twenty-first Day of August, 2007

JON W. DUDAS
*Director of the United States Patent and Trademark Office*